United States Patent [19]
Peng

[11] Patent Number: 6,026,261
[45] Date of Patent: Feb. 15, 2000

[54] PLATEN TYPE SCANNER DRIVING MECHANISM

[75] Inventor: Sheng Yeh Peng, Taipei Shien, Taiwan

[73] Assignee: Silitex Corporation, Taipei, Taiwan

[21] Appl. No.: 09/044,985

[22] Filed: Mar. 20, 1998

[51] Int. Cl.[7] ............................................. G03G 15/04
[52] U.S. Cl. ............................................. 399/211; 358/497
[58] Field of Search ........................... 399/211; 358/497; 355/67

[56] References Cited

U.S. PATENT DOCUMENTS

| | | | |
|---|---|---|---|
| 3,740,137 | 6/1973 | Sato | 399/211 |
| 4,771,315 | 9/1988 | Satomi | 358/497 |
| 4,965,638 | 10/1990 | Hediger | 358/497 |
| 5,801,851 | 9/1998 | Sheng | 358/497 |
| 5,857,133 | 1/1999 | Sun | 399/211 |
| 5,970,288 | 10/1999 | Nanba et al. | 399/211 |

*Primary Examiner*—William Royer
*Assistant Examiner*—William A. Noe
*Attorney, Agent, or Firm*—Rosenberg, Klein & Lee

[57] ABSTRACT

A platen type scanner driving mechanism has a supporting structure which includes an upper casing and a lower casing. A fixed lever extends longitudinally with respect to the support structure between the upper casing and the lower casing. An optical module is slidable along the fixed lever and extends transversely to the fixed lever. A single pulling wire is fixed by two spaced apart locations proximal to the center of the optical module, and a driving unit which drives the single pulling wire. The single pulling wire drives the optical module which is in parallel motion with respect to the fixed lever. The relative disposition of the single pulling wire, driving unit, and the optical module, prevents the optical module from being swung during displacement, reduces loads applied to the driving mechanism and optimizes the driving unit's force.

4 Claims, 7 Drawing Sheets

PLATEN TYPE SCANNER DRIVING MECHANISM

BACKGROUND OF THE INVENTION

The subject matter relates to a platen type scanner driving mechanism, or more specifically, to a platen type scanner driving mechanism that enables balanced forces applied to the left and right sides during its driving process to prevent slight swing.

Conventionally, with a prior art platen type scanner device, the object to be scanned is placed in a fixed position. Subsequently, an electric charge coupler module or a contact type image detector module or like optical module is driven by the driving unit in order that the optical module performs a scanning operation on the object to be scanned.

The light produced from the light source is directed onto the object to be scanned with the reflected light traveling from the reflecting mirror to the lens for convergence. The converged light is focused onto the electric charge coupler and the electric charge coupler processes the optical signals into acceptable analog or digital signals.

In aforesaid conventional platen type scanning device, as shown in FIG. 1, the driving unit is pulled at two ends of the optical module 13 by the wire 11, which drives the optical module 13 to the left and/or to the right along a guide track. However, the combination has shortcomings resulting in excessive turning distance, excessive load on the driving unit, and waste of motor force.

It is obvious from the above that aforesaid conventional platen type scanner driving mechanism involves inconveniences and shortcomings in actual applications that need to be addressed.

To seek possible improvement on said shortcomings, the subject inventor has devoted a great amount of time in research, accompanied by technical applications, and has found a reasonably designed system with effective improvement of said shortcomings.

SUMMARY OF THE INVENTION

It is, therefore, an object of the present invention to provide a platen type scanner driving mechanism including a single pulling wire wound onto idlers and extending below the optical module which forces the optical module to slide along the guiding structure (fixed shaft), whereby relative disposition of the single pulling wire, the idlers, and the optical module prevents the optical module from being swung during motion, reduces loads applied to the driving mechanism, and saves the motor's force.

The platen type scanner driving mechanism, located inside a casing, includes an optical module, a fixed shaft, a wire, a number of idlers and a driving unit. The optical module is mounted to the fixed shaft, the wire is wound on the idlers, with its two ends respectively fitted to suit the optical module. The driving unit drives the wire to move in cycles and to move the optical module in parallel movement.

Between the idlers a spring may be located. The driving unit has a motor and a number of driven gears, while the optical module includes a carrier table and at least one elastic component. The carrier table is located at the bottom side of the optical module on which is provided the elastic component.

The two ends of the wire are respectively fitted to the optical module and there are at least two idlers located below the optical module with the idlers serving to be wound by said wire.

To enable full understanding of the characteristics and technical contents of the subject matter, please refer to the following detailed description with drawings; however, the attached drawings are only for the purposes of reference and description, which should not be used to restrict or limit the subject matter.

DETAILED DESCRIPTION OF THE PREFERRED EMBODIMENT

Figure 1:
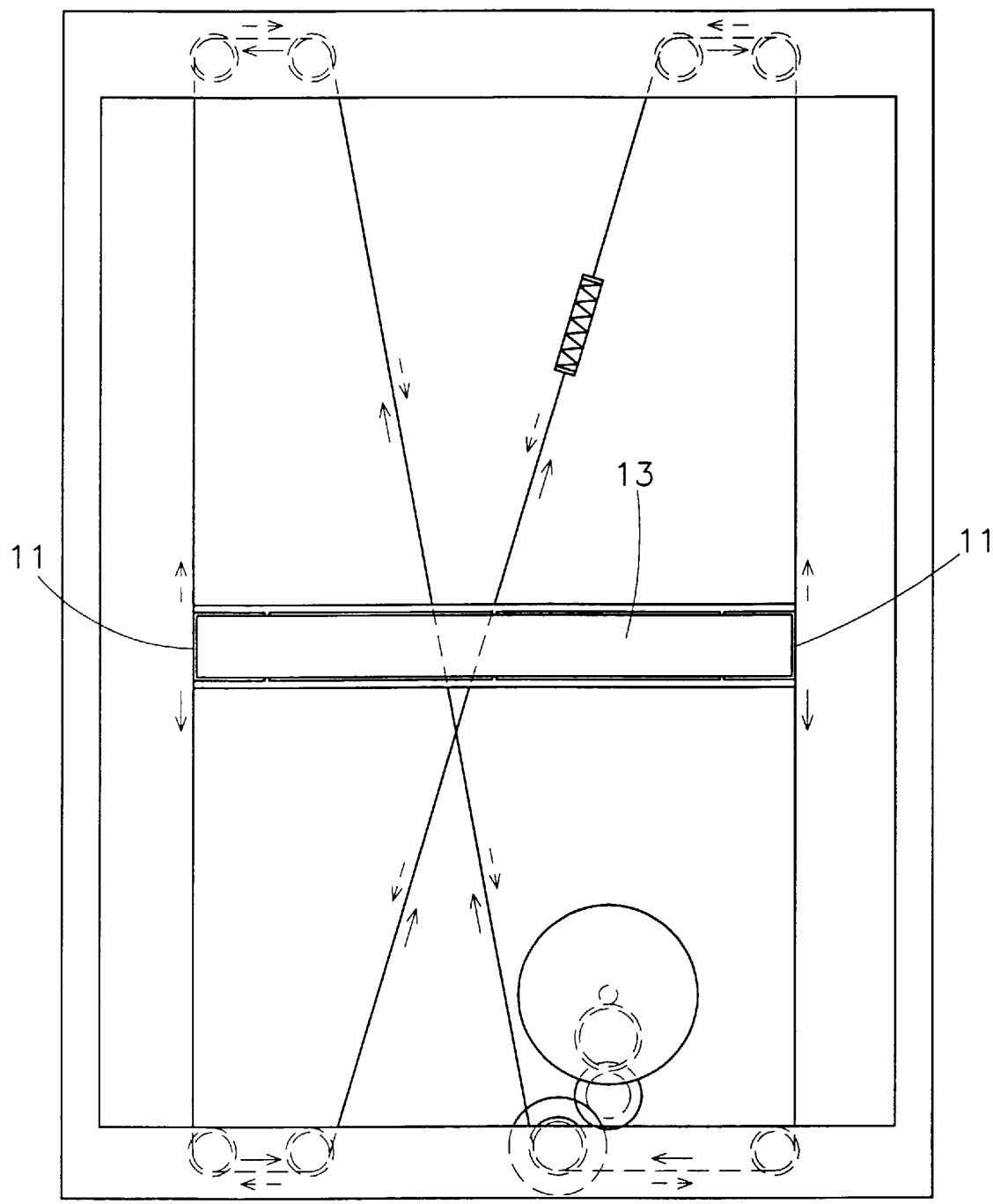
FIG. 1 is a plan view of a prior art of a platen type scanning device driving mechanism.
Figure 2:
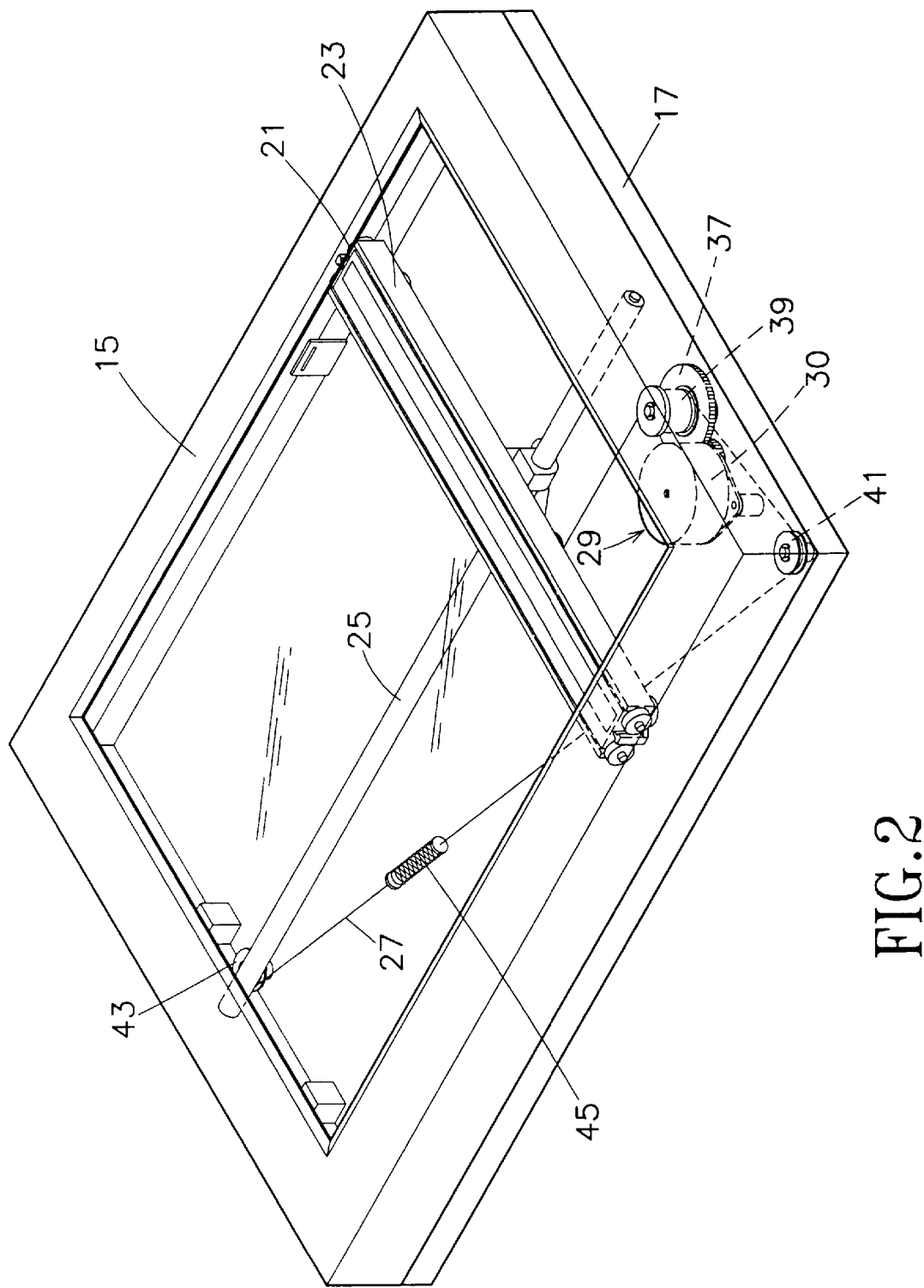
FIG. 2 is a perspective assembled view of the platen type scanner driving mechanism of the present invention.
Figure 3:
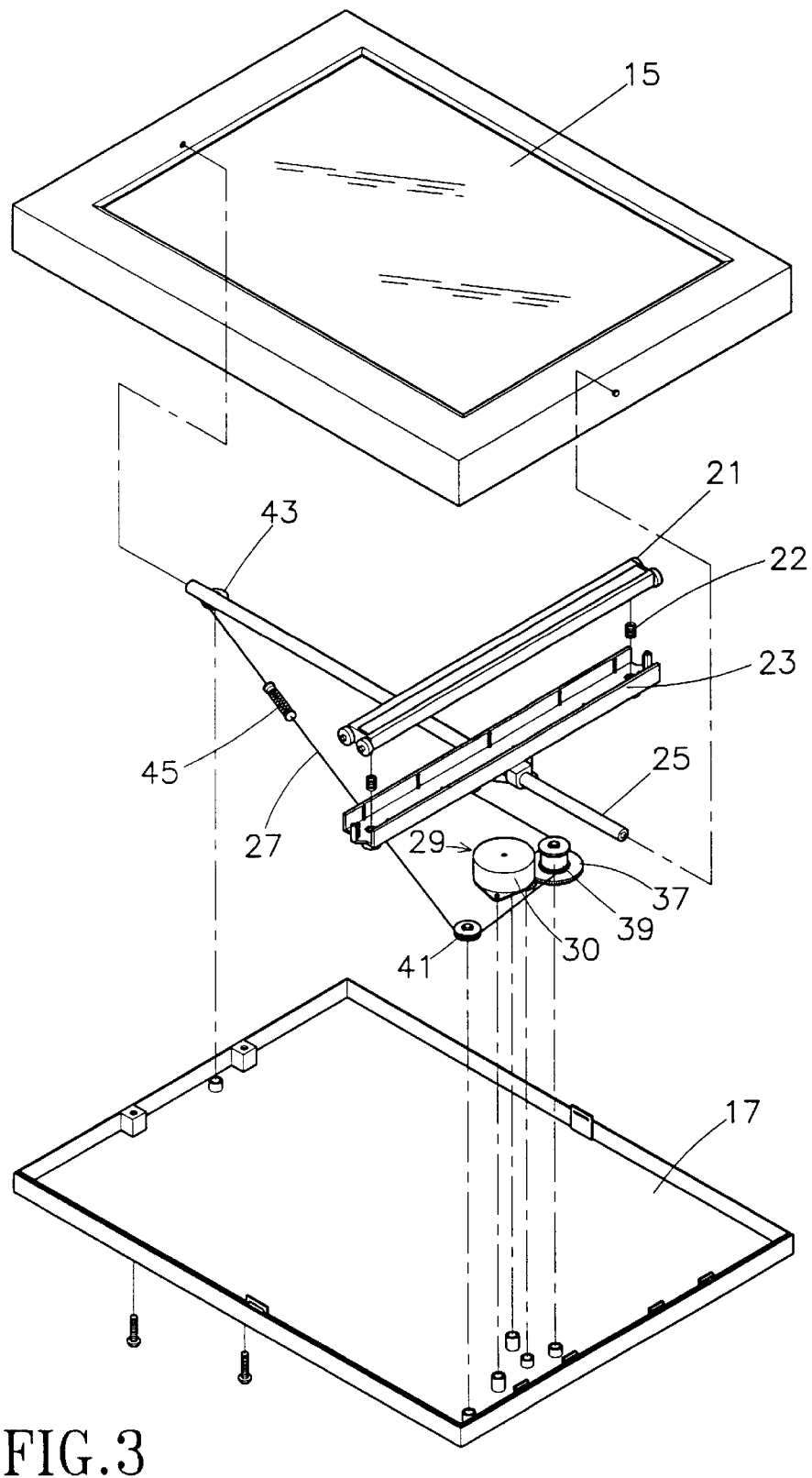
FIG. 3 is an exploded view of the platen type scanner driving mechanism of the present invention.
Figure 4:
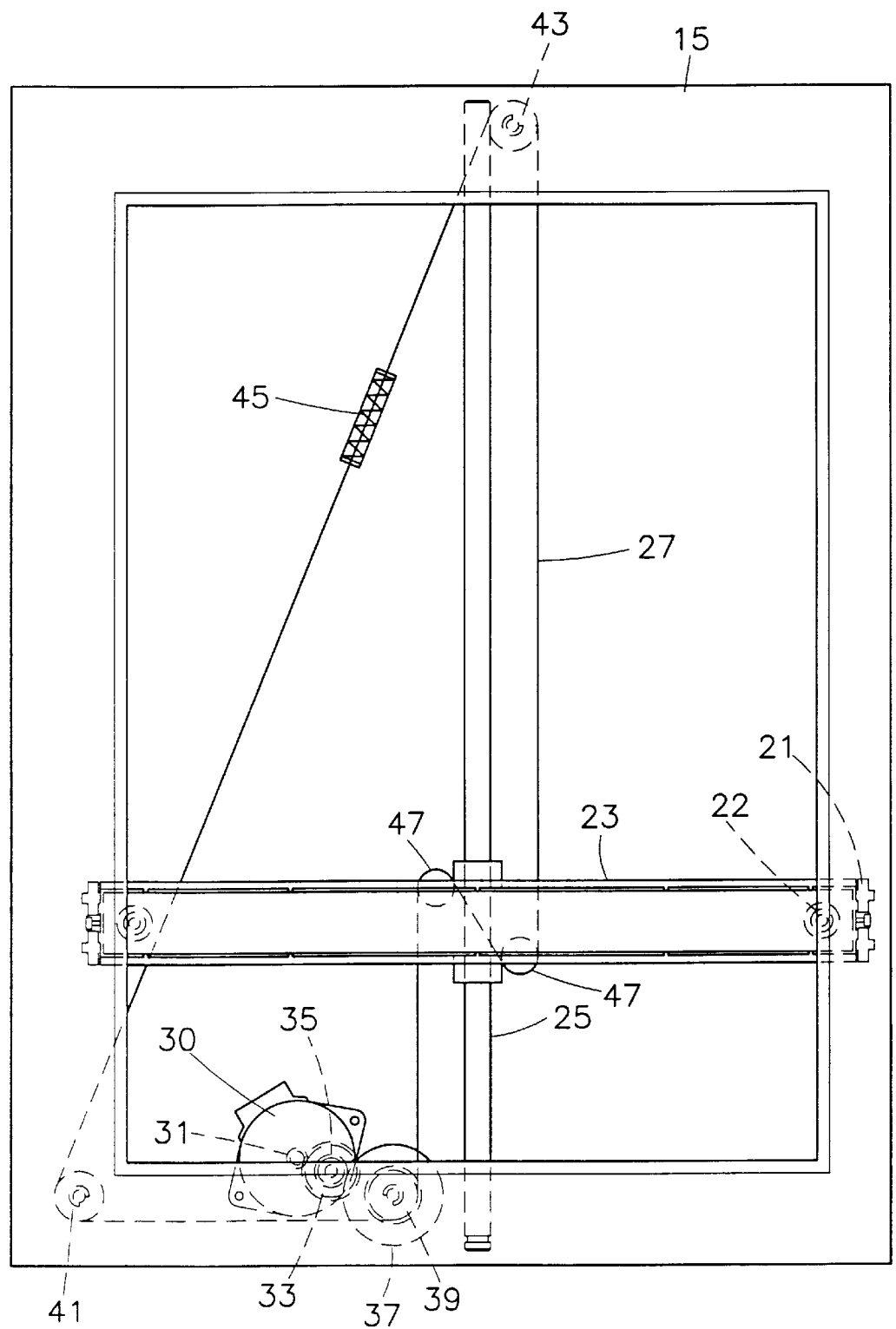
FIG. 4 is a plan view of the platen type scanner driving mechanism of the present invention.
Figure 5:
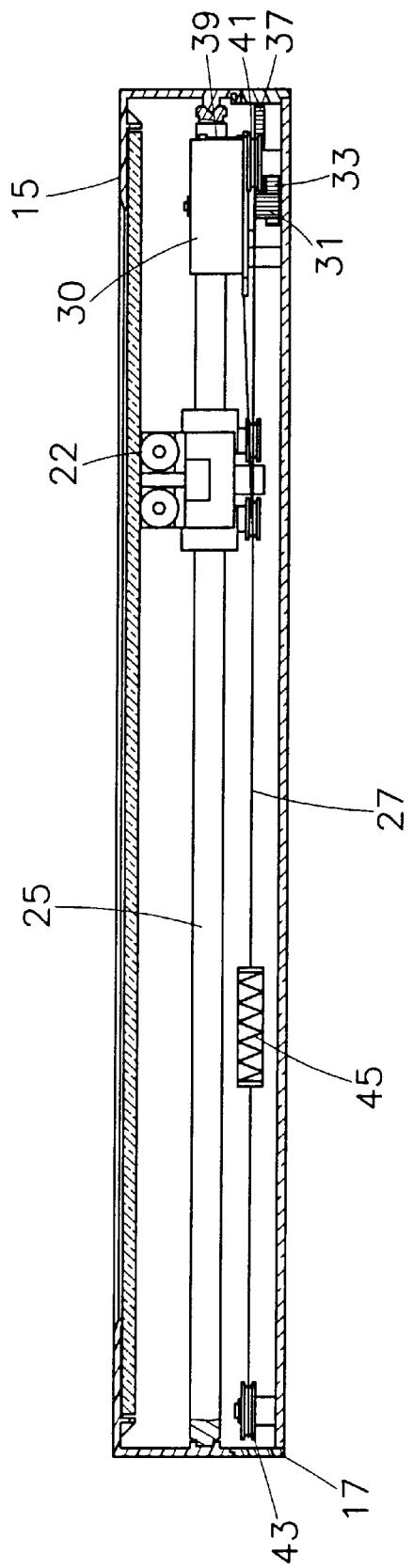
FIG. 5 is a plan sectional view of the platen type scanner driving mechanism of the present invention.
Figure 6:
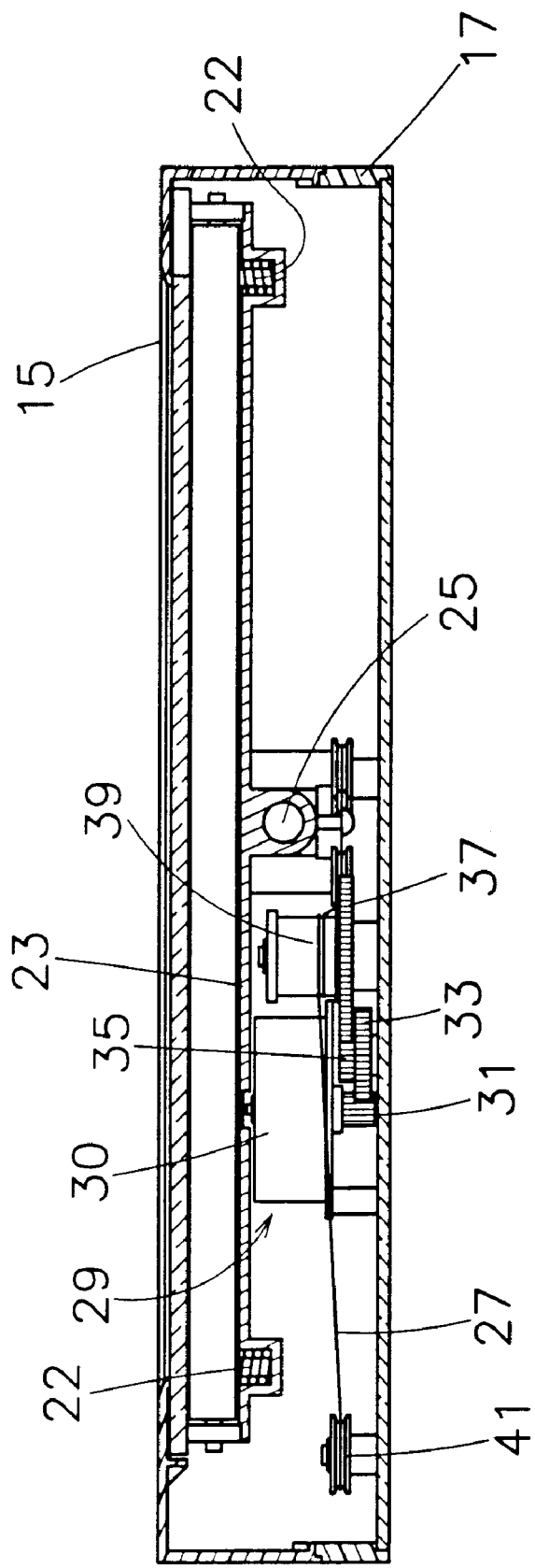
FIG. 6 is a section view of the platen type scanner driving mechanism of the present invention; and, FIG. 7 is a section view of another embodiment of the platen type scanner driving mechanism of the present invention.

Referring to FIGS. 2 through 6 there is illustrated the subject matter of the platen type scanner driving mechanism. The subject matter relates to a type of platen type scanner driving mechanism comprising mainly an optical module 21, an elastic component 22, a carrier table 23, a fixed shaft 25, a wire 27, a driving unit 29 and two idlers 47.

The platen type scanner mechanism is located inside a scanning device including an upper casing 15 and a lower casing 17, which drives the optical module 21 to move and perform a scanning operation. On the glass of the upper casing 15 is placed the object to be scanned, while the lower casing 17, which may be made of a transparent acrylic material, performs the scanning process.

Located inside the optical module 21 are the light source, a reflecting mirror, a lens and an optical sensing component. The light produced from the light source and directed to the object to be scanned, is reflected through the reflecting mirror into the lens for convergence. The converged light is then focused on the optical sensing component. The optical sensing component then processes the optical signals and transforms them into acceptable analog or digital signals.

Below the optical module 21 is an elastic component 22 composed of a number of springs, rubber or elastic pieces. The optical module 21 is positioned inside the carrier table 23. The elastic component 22 is supported between the optical module 21 and the carrier table 23, which provides an upward force to assist the optical module 21 to stick to the glass of the upper casing 15 and keep it from being separated.

The fixed shaft 25 is fixed inside the scanning device with its upper part joined to the carrier table 23. The wire 27 coordinates with the driving unit 29 and the driving unit 29 drives a driven gear set that is composed of a number of gears, which in turn drives the wire 27 to move in cycles responsively displacing the optical module 21 in a parallel movement. The optical module 21 is driven to be displaced on the fixed shaft 25 and perform a scanning operation.

The driving unit 29 drives the driven gear set which transmits force by means of the first gear 31 that is concentrically mounted on a same spindle as the driving motor 30 to rotatively drive the second gear 33. The third gear 35 that is mounted concentrically with the second gear 33 transmits force to rotatively drive the fourth gear 37. The fifth wheel 39 that is mounted concentrically with the fourth gear 37 is driven to transmit force and is a wire collecter.

The sixth idler 41 and the seventh idler 43 are located at specified locations on the lower casing 17. The wire 27 is wound on the fifth wheel 39, the sixth idler 41, the seventh idler 43 and the idler 47 below the optical module 21. The wire may be fitted with a spring 45 that provides proper elasticity to prevent the wire 27 from loosening.

When the driving unit 29 drives the wire 27 to move in cycles, the driving motor 30 will drive the driven gear set to rotate in a clockwise or counter-clockwise direction. The fifth wheel 39, the sixth idler 41, the seventh idler 43 and the idler 47 rotate to control the optical module 21, thus displacing the optical module 21 to the front or rear, and the light produced from the light source is projected on the object to be scanned. The idler 47 is wound by the wire 27 in a manner to reduce friction.

Figure 7:
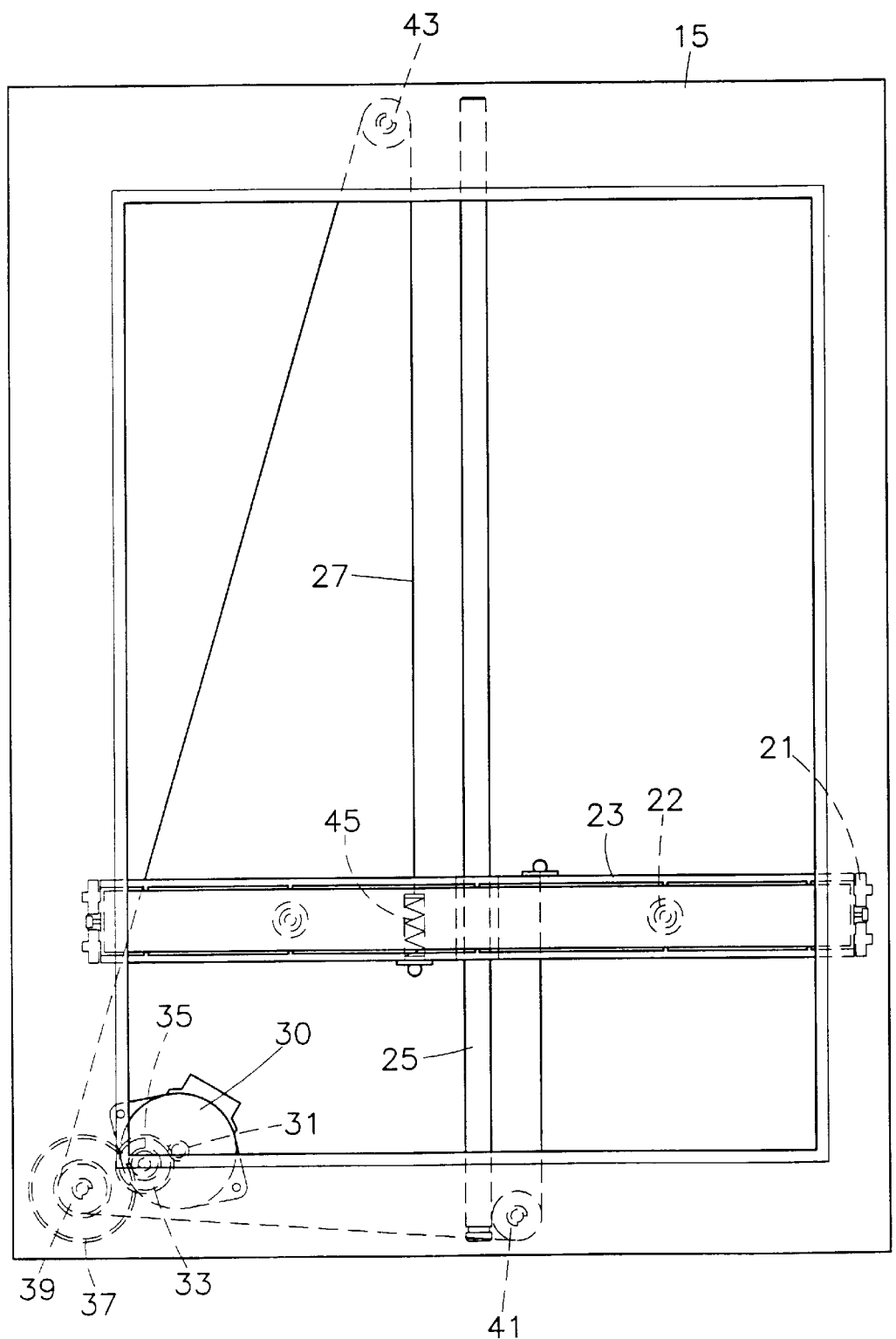

Referring to FIG. 7 there is shown a plan view of another embodiment of the platen type scanner driving mechanism, which is characterized in that there are two fixed ends at the bottom side of the carrier table 23 below the optical module 21 which serve to fix the two ends of the wire and prevents the optical module from swinging when it is being driven.

The platen type scanner driving mechanism assures parallel movement of the optical module 21. The elastic component 22 below the optical module 21, provides the support for the optical module 21 which will firmly stick upwards to the glass of the upper casing 15 and move, so that the difference of height between the glass and the optical module 21 can be absorbed by the elastic component, to assure that the optical module 21 moves steadily to the front and back, thus maintaining consistent light source luminosity and optical distance.

Summing up, with effective improvement on conventional types of platen type scanner driving mechanism which involves such shortcomings as excessive turning moment, excessive load on the driving unit, waste of motor power, inability to maintain parallel movement of the optical module, etc., the subject matter is indeed a novel creation with its novelty and originality that will fully satisfy the qualifications for a Patent right, hence this application is filed in accordance with the Patent Law to protect the subject inventor's rights and interests. Your favorable consideration shall be appreciated.

It is declared hereby that the above description, covering only the preferred embodiment of the subject matter, should not be based to limit or restrict the subject claim, and that all equivalent structural and/or configurational variations and/or modifications easily conceivable to anyone skilled in the subject art, and deriving from the subject description with drawings herein shall reasonably be included in the intent of the subject claims.

I claim:

1. A platen type scanner driving mechanism, comprising:

a supporting structure, including an upper casing and a lower casing, a fixed shaft extending longitudinally of said supporting structure and between said upper and lower casings, an optical module sliding along said fixed shaft and extending transversely thereto, said optical module having a central portion, a single pulling wire having a length, and driving means positioned within said supporting structure for driving said single pulling wire, said driving means including a pair of first idler pulleys mounted on opposing sides of said fixed shaft and beneath said central portion of said optical module, said single pulling wire being wound around said pair of first idler pulleys, said pair of first idler pulleys being fixedly coupled to said optical module at respective coupling locations symmetric about said fixed shaft, thereby applying driving forces to said optical module substantially at said central portion thereof and causing said optical module to remain perpendicular to said fixed shaft as said optical module moves along said fixed shaft.

2. The platen type scanner driving mechanism of claim 1, further including a carrier table disposed beneath said optical module and receiving said optical module therewithin, and an elastic component disposed between said carrier table and said optical module.

3. The platen type scanner driving mechanism of claim 1, further including a plurality of second idlers fixed to said supporting structure, said single pulling wire being wound about said second idlers, and a spring positioned along said length of said single pulling wire providing elasticity thereto.

4. The platen type scanner driving mechanism of claim 1, wherein said driving means further includes a motor and a plurality of driven wheels rotatable supported by said supporting structure, said single pulling wire being wound about said driven wheels.

* * * * *

UNITED STATES PATENT AND TRADEMARK OFFICE
CERTIFICATE OF CORRECTION

PATENT NO. : 6,026,261
DATED : FEB. 15, 2000
INVENTOR(S) : SHENG YEH PENG

It is certified that error appears in the above-identified patent and that said Letters Patent is hereby corrected as shown below:

Title page item [73] delete the name "Silitex Corporation" and
          insert the name --Silitek Corporation--

Signed and Sealed this

Seventeenth Day of October, 2000

Attest:

Q. TODD DICKINSON

*Attesting Officer*                    *Director of Patents and Trademarks*